July 1, 1969 W. G. POLAKOWSKI 3,453,512
BRUSHLESS DC MOTOR
Filed Aug. 25, 1964 Sheet 2 of 3
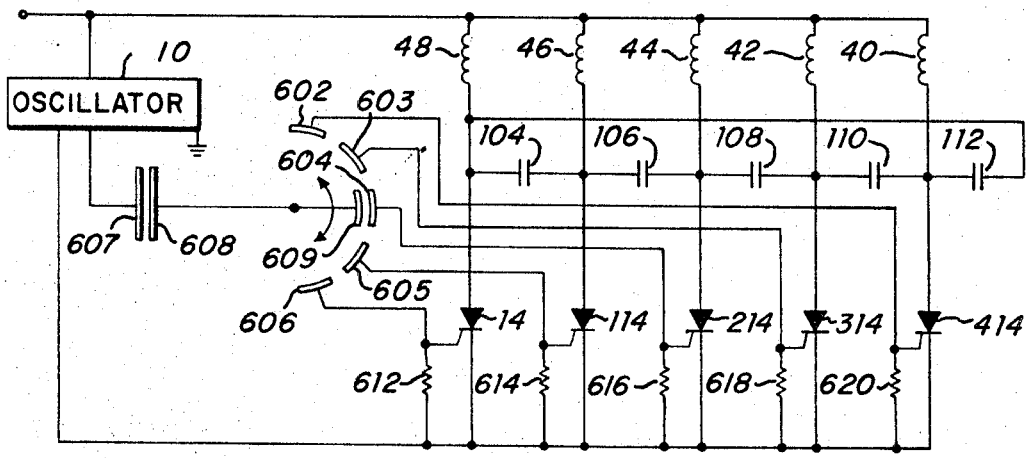
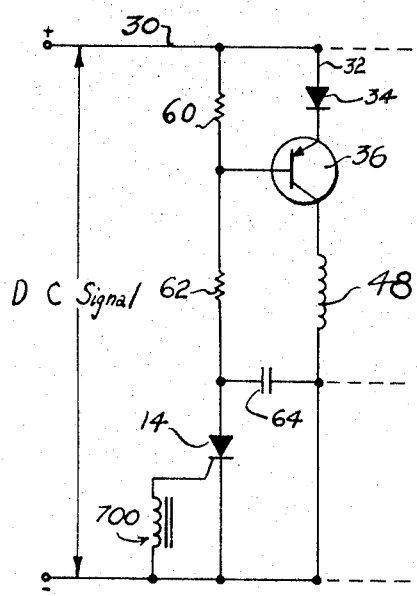
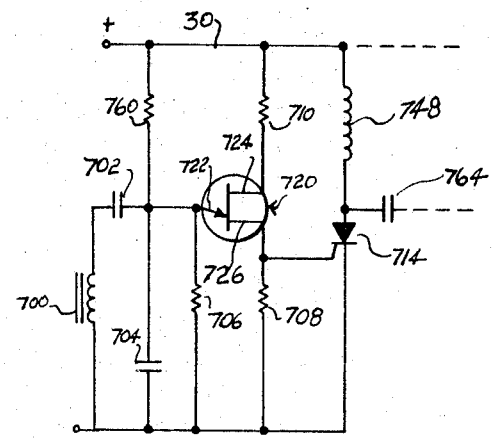
INVENTOR.
WILLIAM G. POLAKOWSKI
BY
ATTORNEY INVENTOR.
WILLIAM G. POLAKOWSKI
BY
Milton E. Gilbert
ATTORNEY United States Patent Office 3,453,512
Patented July 1, 1969

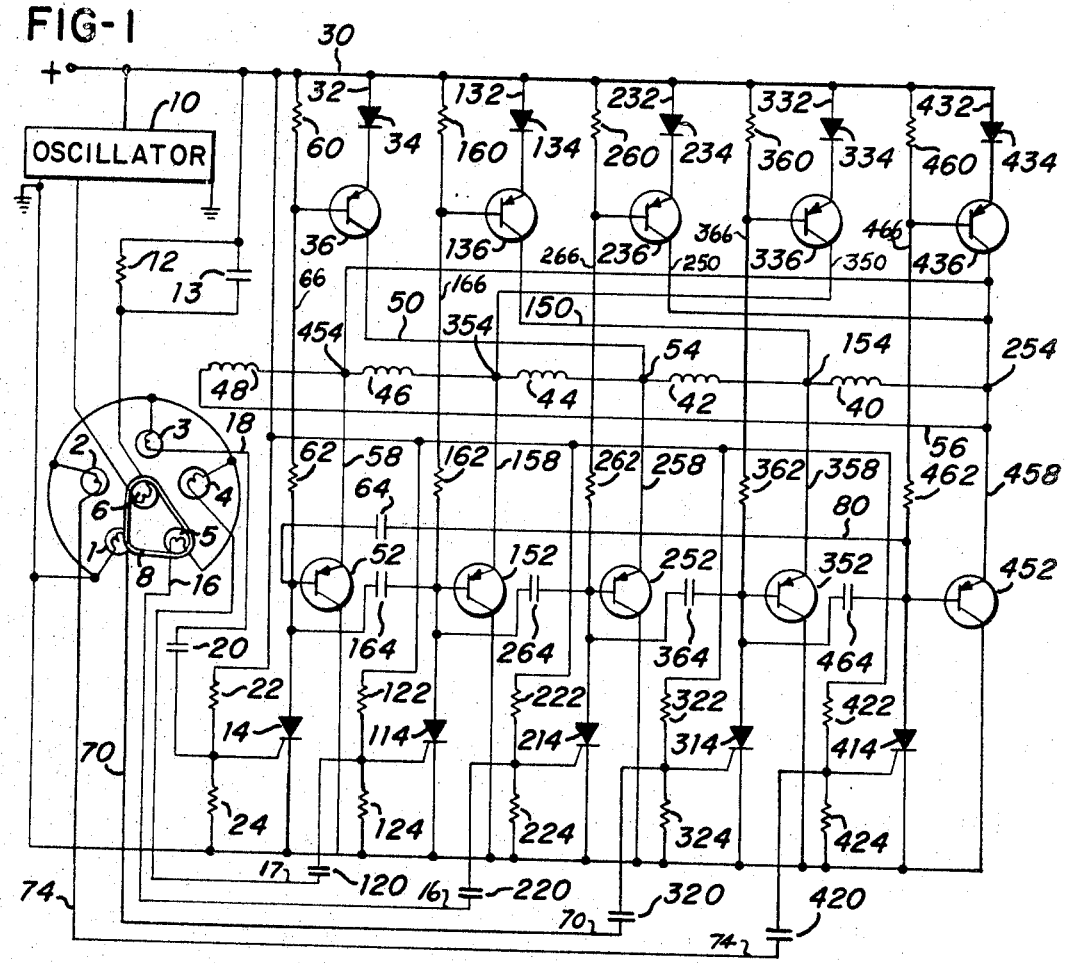
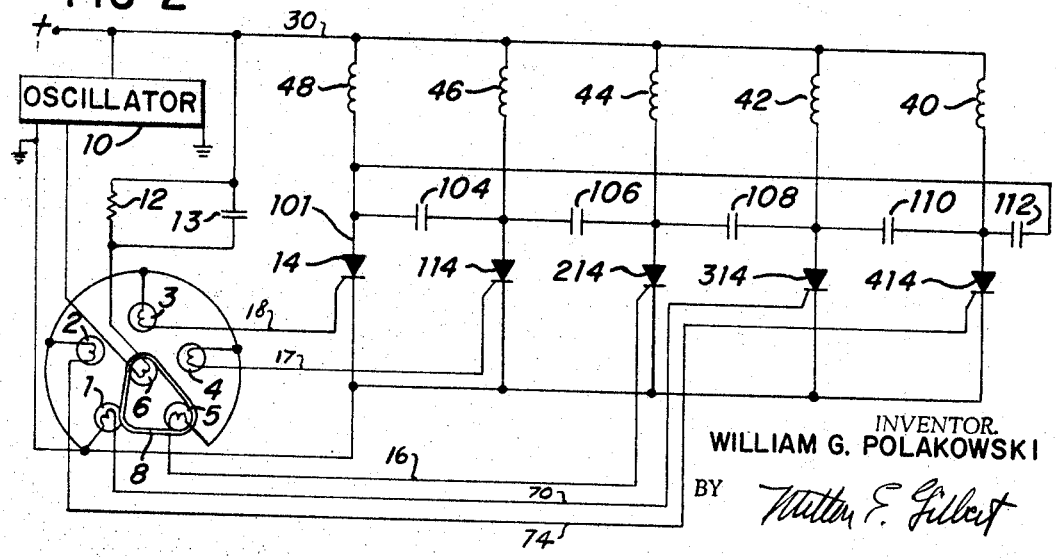

3,453,512
BRUSHLESS DC MOTOR
William G. Polakowski, Dayton, Ohio, assignor, by mesne assignments, to TRW Inc., Cleveland, Ohio, a corporation of Ohio
Filed Aug. 25, 1964, Ser. No. 391,914
Int. Cl. H02k 29/02
U.S. Cl. 318—138                      13 Claims This invention relates to solid state commutation devices for a DC motor which does not employ conventional commutators and brushes.

DC motors today are still largely built with the inclusion of bar type commutators and associated brush sets, with many attendant problems associated therewith. Chief among such limitations is the relatively short life of such motors, due to wear of both brushes and the commutator. Such decrease in life becomes very marked in spacial environments where low ambient pressure or vacuum is encountered. The well-know features and characteristics of DC motors are highly desirable in control systems and especially in the military and defense equipment. However, even though the DC motor has such desirable characteristics, its employment in certain systems has been rejected because of the short brush life and attendant sparking during commutation. Many attempts have been made to develop motors which obtain the required switching of armature conductors by means other than the mechanical switch accomplished by brush-commutator sets. The "inside-out" arrangement of field windings and field poles has been employed together with some armature switching means other than the mechanical brush-commutator assembly. In such an arrangement the armature windings are placed on the stator member and the field poles are placed on the rotor, i.e., the rotor is a permanent magnet; and with the field poles rotating, the axis of the magnetic field produced by the armature current is caused to rotate at the same speed as the rotor. To accomplish this function, means are provided to detect the angular position of the rotor poles so that this information can be continuously transmitted to the stator; switching means are further provided to obtain correct switching of armature conductors to maintain the axis of the armature field 90° removed from that of the rotor, thereby obtaining the required rotor rotation. Many devices have been suggested to perform these required functions of detector of rotor position, selector of armature switches, and armature switches themselves. The most promising armature switches have proven to be solid state devices such as transistors and silicon controlled rectifiers, since they possess the advantage of having no moving parts (c.f. relays) and also have comparatively long life. As a detector of rotor position, various approaches have been suggested such as employing the rotor as a transmitter using its magnetic field as the communicating medium and having suitable detectors on the stator coupled with the rotor transmitter means, to produce a signal to actuate the armature switches. Stator detector devices have been suggested which employ the Hall effect (which produces an output voltage proportional to the product of the strength of the magnetic field and the current through the Hall effect device), magnetorestrictive effects wherein the resistance of a coil of wire or of a crystal varies in proportion to the strength of a magnetic field, saturation effects where the field of the rotor changes conditions in an auxiliary magnetic circuit on the stator, magneto-optical effects, radiant energy effects, capacitative effects, and others.

Armature switch selector circuits have been devised whose complexity depends upon the need for isolating various parts of the circuit. In order to provide a long life, maintenance-free brushless DC motor, the use of relays and thyratrons have generally been rejected in favor of the use of transistors and SCR's.

It is one object of the invention to provide a brushless DC motor wherein a novel armature switch selector is employed, incorporating therein capacitor coupled SCR's. It is a further object of the invention to provide a brushless DC motor employing novel field position detection means. It is a still further object of the invention to provide a brushless DC motor incorporating armature switching circuits containing SCR's wherein the turn-on signal is generated by the rotor position detector means and the turn-off signal is generated by a capacitor. These and further objects of the invention will become more readily apparent upon a consideration of the description following hereinafter, and an examination of the drawings, in which:

FIGURE 1 is a schematic diagram of a rotor position detector of the invention incorporated into a novel armature switch selector circuit;

FIGURE 2 is a schematic diagram of a modified switch selector circuit usable with the rotor position detector of FIGURE 1;

FIGURE 6 is the schematic diagram of an armature switching circuit employing the rotor position detector of FIGURE 5;

FIGURE 7 is a portion of an alternate schematic of an armature switching circuit employable with any of the rotor position detectors previously illustrated; and FIGURE 8 is a still further portion of an alternate schematic of an armature switching circuit employable with any of the rotor position detectors previously illustrated.

Figure 3:
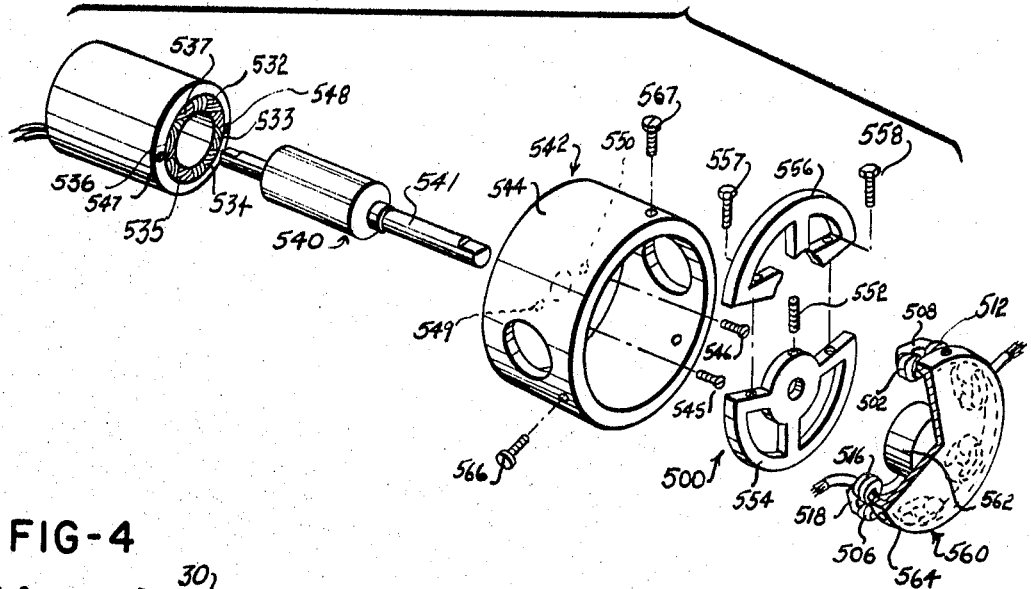
FIGURE 3 is an expanded perspective view of a further modification showing a novel rotor position detector.

In the drawings, like parts are designated by like reference numerals. Considering the modification of FIGURE 1, it is seen that the position sensing device for the rotor employs inductive coupling of a series of coils 1, 2, 3, 4, 5, and 6, which are mounted on the stator in the fixed arrangement shown. A coupling loop 8, or waveguide, is mounted on the end of the rotor, and the inner end of this waveguide encompasses coil 6, whereas the outer portion of the loop in turn will couple the several coils 1 through 5, progressively, as the rotor rotates. A conventional RC or other type of oscillator 10 is employed to drive the coil 6. The resistor 12 and capacitor 13 serve as a current limiting network. As each coil 1 through 5 is coupled to coil 6 inductively, a pulse signal is created which is transmitted over lines 70, 74, 18, 17, and 16, respectively, through coupling capacitors 320, 420, 20, 120, and 220, respectively, to the gates of respective SCR's 314, 414, 14, 114, and 214. The various resistance pairs 22–24, 122–124, 222–224, 322–324, and 422–424 serve to bias the SCR's 14 114, 214, 314, and 414, respectively. When the pulse signal is successively transmitted to the gate of the SCR, it turns on and immediately turns on its associated power transistor pairs which couple the armature coils to pulse and ground.

In further explanation of the operation of the switching circuit of FIGURE 1, assume that the waveguide is in the position shown wherein the coil 5 is coupled to the coil 6. In this position a pulse signal is transmitted over line 16 and coupled through capacitor 220 to the gate or SCR 214. When SCR 214 turns on, current is permitted to flow from plus line 30 through line 232, diode 234, and through the emitter-collector path of transistor 236 to the armature coils 40, 42, 44, 46 and 48. The current will flow from transistor 236 over line 250 to the junction 254. At the same timt that the SCR 214 turns on transistor 236, it will also turn on transistor 252. The current flowing to junction 254 will then take two paths, i.e., through coils 40 and 42 to junction 54, and via line 56 through coils 48, 46, and 44 to junction 54. From junction 54, current is permitted to flow to ground through transistor 252 over line 258, since this transistor is the only other transistor turned on when the SCR 214 is on. It is thus seen that three coils 44, 46, and 48 will have current flowing through them of one polarity, and the two coils 40 and 42 will have current flowing through them of the opposite polarity. The physical arrangement of these coils is such that in combination with the field of the rotor magnet motion will be imparted to the rotor whereby the waveguide 8 is caused to rotate. Assuming clockwise rotation was viewed in FIGURE 1, the waveguide will move to decouple coil 5 with coil 6, and couple coil 1 to coil 6. This type of commutation is exactly similar to the commutation obtained with conventional brushes. The resistors 260 and 262 are respective base biases for the transistors 236 and 252.

When coils 1 and 6 are next coupled, the SCR 214 still remains on, since it is well understood that the nature of SCR's is that a signal is required to turn them on, and that they remain on until a turn-off signal is generated at the anode of the SCR. With coils 1 and 6 coupled, a pulse signal generated at coil 1 is transmitted over line 70 through coupling capacitor 32 to turn on SCR 314. With SCR 314 turned on, current is permitted to flow through line 366 through the commutating capacitor 364 to couple back to the SCR 214. With SCR 314 turned on, the voltage at its anode drops to ground, since the SCR acts like a short and a negative voltage is generated at that point. This negative voltage is coupled back through the coupling capacitor 364 to impose this negative voltage at the anode of SCR 214; and since the SCR 214 anode already had negative voltage on it, i.e., it was turned on, the further imposition of negative voltage at the anode of SCR 214 serves to turn it off. With the SCR 214 turned off, the transistors 252 and 236 are also turned off and current ceases to flow from line 30 via 232, 234, and 250 to the coils of the armature. However, since SCR 314 has now turned on, the transistors 336 and 352 are turned on. Current is now permitted to flow from line 30 to line 332, diode 334, the emitter-collector path of transistor 336 and over line 350 to the junction 354. The current flowing to junction 354 will then take two paths, i.e., through coils 44 and 42 to junction 154, and through coils 46, 48, line 56 and coil 40 back to junction 154. Since transistor 352 is also turned on, current will flow from junction 154 over line 358 to ground. It is thus seen that with coils 1 and 6 coupled the armature coils 46, 48, and 40 will have current flowing through them of one polarity, and the coils 42 and 44 will have current flowing through them of the opposite polarity. Additional rotation will then be imparted to the rotor. In similar manner, as the waveguide 8 continues to rotate and couple coils 2, 3, and 4, the SCR's 414, 14 and 112 will be successively turned on and the SCR's 314, 414, and 14 will be successively turned off. It is thus seen that with a DC supply to operate the motor, the SCR's nevertheless are operated from the AC output of the oscillator 10 in order to reduce the number of components required and with the capacitative coupling, only low signal pulses are required to turn on and off the SCR's.

In the embodiment of FIGURE 2, the same rotor position detector and oscillator as indicated in FIGURE 1 is employed, however the switching circuit has been greatly simplified. Whereas in the embodiment of FIGURE 1 all of the armature coils were excited, in the embodiment of FIGURE 2 only one coil at a time is driven. Thus, assuming that the waveguide couples coils 3 and 6 together, then SCR 14 is immediately turned on by the pulse signal from coil 3 to permit current to flow from line 30 through coil 48. When the waveguide 8 rotates to couple coil 6 to coil 4, then the pulse signal transmitted over line 17 turns SCR 114 on to permit the capacitor 104 to charge and draw the anode 101 of the SCR 14 below ground to turn off the SCR 14. In this manner upon successive coupling of the coils 5, 1 and 2 the SCR's 214, 314 and 414 are turned on and the capacitors 104, 106 and 108 serve to successively turn off the preceding SCR's 114, 214 and 314.

Figure 4:
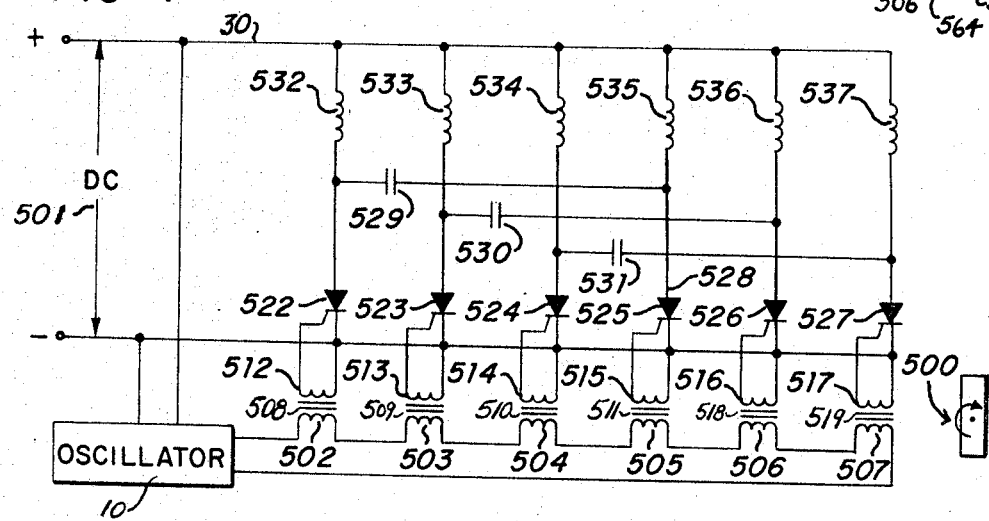
FIGURE 4 is an electrical schematic diagram of the armature switch selector circuit of the modification of FIGURE 3.

In the embodiment of FIGURE 3 a physical arrangement of a novel rotor position detector is illustrated employing the principle of magnetic saturation. In this embodiment a series of saturable core transformers are employed with AC running into the SCR's. Referring first, however, to FIGURE 4, wherein the electrical schematic diagram of the embodiment of FIGURE 3 is shown, it is seen that similar to the prior embodiment a DC supply 501 is fed to an oscillator 10 which supplies continuous AC current to the primaries 502, 503, 504, 505, 506 and 507 of six saturable core transformers 508, 509, 510, 511, 518 and 519, respectively. The secondaries of these transformers are indicated as 512, 513, 514, 515, 516 and 517, respectively. A rotating piece of iron or magnet 500 serves to couple the flux of three coils simultaneously. As indicated previously, the oscillator 10 is connected at all times and the primaries of the saturable core transformers (which are preferably in the form of toroids) are continuously supplied with current. Thus the positioning of the iron 500 across the selected toroids serves to saturate the iron core and prevent any induced voltage in the secondary, i.e., the transformers will be turned off. Considering the circuits shown in FIGURE 4, and assuming that the iron 500 has saturated the cores 511, 518 and 519, thus permitting the coils 502, 503 and 504 to be coupled with the secondary coils 512, 513 and 514, then the SCR's 522, 523 and 524 will be turned on. Current will thus be permitted to flow through coils 532, 533 and 534, respectively. As the rotor moves, it will reposition the iron 500 so that it will maintain the turned-off state of the toroids 518 and 519, but will now move away from the toroid 511 and will turn off the secondary 512 of toroid 508. When the toroid 511 is permitted to turn on, an induced voltage will appear in the secondary 515. The negative voltage generated at the anode of the SCR 525 will be coupled back through line 528 to the coupling capacitor 529 to pull the anode of SCR 522 further below ground so that the SCR 522 is turned off. In this manner the continuous rotation of the rotor will reposition the iron 500 so that it consecutively turns on another toroid which will immediately then turn off a toroid which had previously been unsaturated. Thus, it is seen that in the embodiment of FIGURE 4, three toroids at a time are permitted to transfer current to the armature coils, thus creating a rotating field.

A physical embodiment of the device illustrated in FIGURE 4 is shown in FIGURE 3, wherein a stator is indicated as comprising the coils 532, 533, 534, 535, 536 and 537. This stator is provided with tapped holes 547 and 548, to which is affixed a mounting cylinder 542 as by the screws 545 and 546 which pass through holes 549 and 550 in the mounting cylinder. A rotor 540 is appropriately mounted within the stator and its shaft 541 protrudes through and within the mounting cylinder. Also affixed within the mounting cylinder is a magnetic coupling plate 560 which is fastened within the mounting cylinder as by screws 566 and 567. The coupling plate 560 has affixed centrally thereof a magnet 562 and has peripherally mounted thereon a series of toroid cores such as 508 and 518. The primary and secondary windings on these toroids are indicated as 502, 516, 508 and 518, respectively.

Mounted on the end of shaft 541 and juxtaposed to the coupling plate 560 is the rotating plate 500 which is formed into a ferromagnetic portion 554 and a non-ferromagnetic balance portion 556. The portion 554 may conveniently be made of steel, whereas the portion 556 may be made of brass and serves as a counterbalance. The two parts are fastened together as by the screws 557 and 558, and the thus assembled rotating plate 500 is affixed to a flatted portion of the shaft 541 as by the set screw 552.

Figure 5:
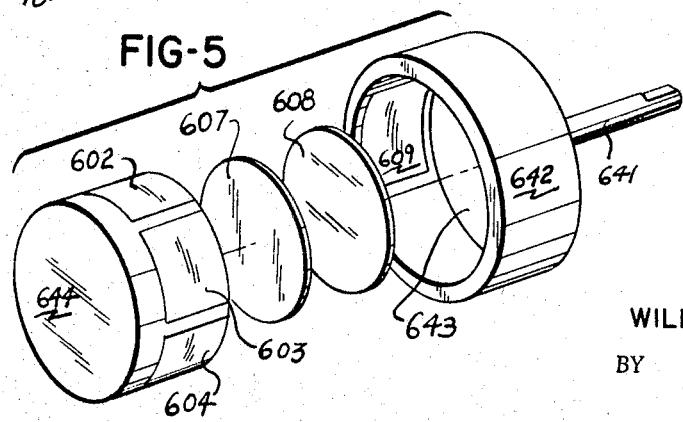
FIGURE 5 is a further embodiment of a rotor position detector, in perspective.

Another embodiment of a rotor position detector is illustrated in FIGURE 5, employing a series of capacitors. In this embodiment the rotor shaft 641 has affixed to it at one end thereof a cylinder 642 which has a pair of capacitor plates 608 and 609 affixed thereto. In one preferred arrangement the plate 608 is bonded or otherwise affixed to the vertical wall 643 of the cylinder 642, and the plate 609 is embedded within the internal surface of the cylinder. A fixed drum 644, i.e., fixed relative to the stator, has mounted thereon the capacitor plate 607 and a series of plates 602, 603, 604, etc. FIGURE 6 illustrates an electrical schematic employing the capacitive coupling shown in FIGURE 5. As indicated in FIGURE 6 the plates 607 and 608 are always opposed to one another, whereas the moving plate 609 would consecutively couple each one of the plates 602–606. The remaining portion of the circuit shown in FIGURE 6 is very similar to the circuit of FIGURE 2. In such arrangement only one coil at a time is turned on in a progressive manner to obtain a rotating field. In the position of the rotating plate 609 shown in FIGURE 6, it is seen that the SCR 214 is turned on since the plates 604 and 609 are coupled. The various resistances such as 612, 614, 616, 618 and 620 serve to bias their respective SCR's 14, 114, 214, 314 and 414. The capacitors 104, 106, 108, 110 and 112 serve to turn off the preceding SCR when the coupling capacitor 609 is rotated to couple the next following capacitor plate 605, etc.

In the event a low current, low power motor is to be provided, the circuit of FIGURE 7 would be preferred. In this circuit an arrangement similar to the schematic of FIGURE 1 is employed, together with a rotor position detector similar to that of FIGURES 3 and 4. Thus we find the toroid 700 having its secondary connected to the SCR 14, and like parts bearing like numerals as illustrated in FIGURE 1. We thus see that when the toroid 700 turns on the SCR 14, current is permitted to flow from plus line 30 through line 32, diode 34, and through the emitter-collector path of transistor 36 to the armature coil 48. The resistors 60 and 62 serve to bias the transistor 36, and the circuit functions to cause current to flow in only one direction through the coil 48. As contrasted to this, the circuit of FIGURE 1 will cause current to flow in both directions through the armature coils during the operation of the motor. We thus see that whereas in the circuit of FIGURE 1 all of the copper, i.e., all of the armature coils, is employed at all times to carry current (three of the coils carrying current in one direction and two in an opposite direction, thus requiring more power). in the circuit of FIGURES 7 only half the copper is employed, since the rotor position detector similar to that shown in FIGURES 3 and 4 is employed wherein three coils or half the copper is turned on at any one time. Additionally, the circuit of FIGURE 7 employs the transistor 36 as an amplifier, thus aiding the weak signals generated by the toroids, relative to those generated by the rotating waveguide of FIGURE 1. The balance of the circuit is indicated by dotted lines in FIGURE 7, and will consist of networks similar to that shown in FIGURE 7 multiplied by the number of armature coils present.

A further schematic employable with the rotor position detector such as shown in FIGURES 3 and 4 is shown in FIGURE 8. In this circuit very small or minute current can be employed to turn it on and off. This is due to the nature of the SCR, which is used to trigger a transistor 720 to permit a previously charged capacitor to discharge. As seen in FIGURE 8, the toroid secondary 700 is coupled to a capacitor 702. When the rotor couples the primary and secondary of the toroid so that a signal appears on the secondary 700, the capacitor 702 serves to couple such signal to the emitter 722 of the unijunction transistor 720. This transistor has two bases 724 and 726. When current appears at the emitter 722 of the transistor 720, current will be permitted to flow from plus line 30 through resistor 710, the bases 724 and 726, and resistor 708 to ground. The line current serves to charge-up the capacitor 704 through a voltage divider network 760 and 706. The capacitor 704 remains charged and when the signal appears at the secondary 700, thus triggering the emitter 722 of the transistor 720, the energy stored in capacitor 704 will be discharged through resistor 708 to turn on the SCR 714. In this manner the line voltage is employed to charge-up the capacitor and the toroid is employed only as a trigger for triggering the transistor 720 so that amplification of the small signal created in the toroid 700 is afforded. The resistors 710 and 708 function as current limiting resistors to permit sufficient voltage buildup necessary to trigger the SCR 714. Once the SCR 714 is turned on, then current will flow through the motor coil 748. Turn-off of the SCR 714 is afforded by the capacitor 764 in the same manner as described in connection with the circuit of FIGURE 1, for example. The advantage of the circuit shown in FIGURE 8 appears evident in the case where only extremely small inductive commutators can be employed such as small diameter motors are to be provided.

Although various modifications and arrangements of parts have been disclosed, it is believed to be readily understood that one skilled in the art can devise further modifications and rearrangements of both the elements and their circuitry, while still remaining within the spirit and scope of the invention.

What I claim is:

1. A commutatorless direct current motor comprising in combination:
   a rotating field structure;
   a stationary armature having a plurality of armature windings;
   means for detecting the angular position of said rotating field and creating a signal representative thereof;
   means for switching power to said armature windings;
   a selector network for receiving said signal and activating said armature winding switching means in accordance therewith;
   said armature winding switching means including a plurality of SCR's operating in a switching mode, each SCR having a gate, cathode and anode electrodes, the gate electrode being connected so as to receive said signal in accordance with the angular position of said rotating field, thereby to turn on said SCR;
   and a plurality of coupling capacitors each connected so as to impose a negative voltage upon the anode of a first SCR to turn off said SCR when the gate electrode of a second SCR receives said signal, whereby said SCR's are successively turned on and off in response to the angular position of said rotating field to permit power to be applied to said armature windings;
   said angular position detecting means comprises a first coil and a series of stationary coils equal in number to the number of SCR's and a rotary inductive coupling member mounted to rotate with said field structure and adapted to sequentially inductively coupled said first coil to each of said stationary coils, and said stationary coils being each connected to the gate electrode of an SCR, whereby successive pulsed signals are created;
   an oscillator connected to drive said first coil, each SCR having associated therewith a pair of transistors having their emitter-collector paths in series with the armature windings and their base electrodes in circuit with the anode of their associated SCR, whereby when an SCR is turned on it will serve to immediately turn on its associated pair of transistors and permit power to flow to said windings.

2. The commutatorless motor of claim 1 wherein said armature windings are so connected that upon a signal being generated power will flow through all of said windings simultaneously with current flowing through a portion of said windings of one polarity and current flowing through the balance of said windings of the opposite polarity.

3. A commutatorless direct current motor comprising in combination:
   a rotating field structure;
   a stationary armature having a plurality of armature windings;
   means for detecting the angular position of said rotating field and creating a signal representative thereof;
   said means comprising a series of saturable core transformers having primary and secondary coils, and an element of ferromagnetic material juxtapositioned to at least one of said transformers, said element and series of transformers being so mounted as to be rotatable relative to one another, the rotatable member being arranged to rotate with said field structure, whereby when said ferromagnetic element couples the flux of a transformer it saturates the core thereof and prevents any voltage being induced in the secondary coil of such transformer while permitting the remaining transformers to generate said signal;
   means for switching power to said armature winding including a plurality of SCR's operating in a switching mode, each SCR having a gate, cathode and anode electrodes, the gate electrodes being connected so as to receive said signal in accordance with the angular position of said rotating field, thereby to turn on said SCR;
   a selector network for receiving said signal and activatin said armature winding switching means in accordance therewith;
   and a plurality of coupling capacitors each connected so as to impose a negative voltage upon the anode of a first SCR to turn off said SCR when the gate electrode of a second SCR receives said signal, whereby said SCR's are successively turned on and off in response to the angular position of said rotating field to permit power to be applied to said armature windings.

4. The commutatorless motor of claim 3 wherein said transformers are constructed as individual toroids with the primaries thereof being continuously supplied with current, and said ferromagnetic element being affixed to rotate with said field structure.

5. The commutatorless motor of claim 4 wherein said ferromagnetic element is of such size as to couple the flux path of a plurality of toroids simultaneously.

6. The commutatorless motor of claim 3 wherein an oscillator is connected to drive the primary coils of said transformers, and wherein said armature windings are so connected that upon a signal being generated power will flow through a plurality of said armature windings and when the next signal is generated in additional armature winding will receive power while power will be simultaneously disconnected from an armature winding which previously had received power.

7. A commutatorless direct current motor comprising in combination:
   a rotating field structure;
   a stationary armature having a plurality of armature windings;
   means for detecting the angular position of said rotating field and creating a signal representative thereof;
   said means comprising a series of capacitor plates, a portion thereof being mounted to rotate with said field structure and the remainder being stationary and juxtaposed to said rotating plates, whereby said rotating plates are selectively coupled to said fixed plates to generate said signal;
   one fixed capacitor plate and one rotating capacitor plate remaining juxtaposed to one another at all times; there being one additional rotating capacitor plate which is progressively coupled to the balnace of the fixed capacitor plates;
   means for switching power to said armature windings including a plurality of SCR's operating in a switching mode, each SCR having a gate, cathode and anode electrodes, the gate electrode being connected so as to receive said signal in accordance with the angular position of said rotating field, thereby to turn on said SCR;
   a selector network for receiving said signal and activating said armature winding switching means in accordance therewith;
   and a plurality of coupling capacitors each connected so as to impose a negative voltage upon the anode of a first SCR to turn off said SCR when the gate electrode of a second SCR receives said signal, whereby said SCR's are successively turned on and off in response to the angular position of said rotating field to permit power to be applied to said armature windings.

8. A commutatorless direct current motor comprising in combination:
   a rotating field structure;
   a stationary armature having a plurality of armature windings;
   means for detecting the angular position of said rotating field and creating a signal representative thereof;
   means for switching power to said armature windings, comprising a series of transistors each having its emitter-collector path in series with an armature winding;
   means for switching power to said armature winding including a plurality of SCR's operating in a switching mode, each SCR having a gate, cathode and anode electrodes, the gate electrode being connected so as to receive said signal in accordance with the angular position of said rotating field, thereby to turn on said SCR;
   a selector network for receiving said signal and activating said armature winding switching means in accordance therewith;
   and a plurality of coupling capacitors each connected so as to impose a negative voltage upon the anode of a first SCR to turn off said SCR when the gate electrode of a second SCR receives said signal, whereby said SCR's are successively turned on and off in response to the angular position of said rotating field to permit power to be applied to said armature windings.

9. The commutatorless motor of claim 8 wherein said angular position detecting means comprises a series of saturable core transformers having primary and secondary coils, and an element of ferromagnetic material juxtapostioned to at least one of said transformers, said element and series of transformers being so mounted as to be rotatable relative to one another, the rotatable members being arranged to rotate with said field structure, whereby when said ferromagnetic element couples the flux of a transformer it saturates the core thereof and prevents any voltage being induced in the secondary coil of such transformer while permitting the remaining transformers to generate said signal.

10. The commutatorless motor of claim 9 wherein said switching transistors operate as amplifiers of the signal generated by said transformers, the secondary of each transformer being connected to the gate electrode of an SCR.

11. A commutatorless direct current motor comprising in combination:
   a rotating field structure;
   a stationary armature having a plurality of armature windings;
   means for detecting the angular position of said rotating field and creating a signal representative thereof;
   means for switching power to said armature windings, comprising a series of unijunction transistors having both bases in series with an armature winding;
   means for switching power to said armature winding including a plurality of SCR's operating in a switching mode, each SCR having a gate, cathode and anode electrodes, the gate electrode being connected so as to receive said signal in accordance with the angular position of said rotating field, thereby to turn on said SCR;
   a selector network for receiving said signal and activating said armature winding switching means in accordance therewith;
   and a plurality of coupling capacitors each connected so as to impose a negative voltage upon the anode of a first SCR to turn off said SCR when the gate electrode of a second SCR receives said signal, whereby said SCR's are successively turned on and off in response to the angular position of said rotating field to permit power to be applied to said armature windings.

12. The commutatorless motor of claim 11 wherein said angular position detecting means comprises a series of saturable core transformers having primary and secondary coils, and an element of ferromagnetic material juxtapositioned to at least one of said transformers, said element and series of transformers being so mounted as to be rotatable relative to one another, the rotatable member being arranged to rotate with said field structure whereby when said ferromagnetic element couples the flux of a transformer it saturates the core thereof and prevents any voltage being induced in the secondary coil of such transformer while permitting the remaining transformers to generate said signal.

13. The commutatorless motor of claim 12 wherein the emitter of each unijunction transistor is connected so as to receive said signal, said switching means further including a capacitor connected in an emitter-base path of said transistor and to the gate electrode of an SCR, said capacitor being connected across the line so as to be charged up by line voltage, whereby the toroids operate as a trigger for said transistors which in turn serve to discharge a capacitor to trigger the SCR's so that only small inductive toroids need be employed.

References Cited

UNITED STATES PATENTS

| | | | |
|---|---|---|---|
| 3,153,185 | 10/1964 | Hummel | 318—254 |
| 3,214,663 | 10/1965 | Kreutzen | 318—138 |
| 3,229,179 | 1/1966 | Hetzel | 318—138 |
| 3,239,739 | 3/1966 | Scholl | 318—138 |
| 3,247,433 | 4/1966 | Lasch et al. | 318—138 |
| 2,870,388 | 1/1959 | Thomas | 318—138 |
| 2,887,640 | 5/1959 | Thomas | 318—138 |
| 2,980,839 | 4/1961 | Haeussermann | 318—138 |
| 3,140,434 | 7/1964 | Hetzel | 318—138 X |

ORIS L. RADER, *Primary Examiner.*

G. R. SIMMONS, *Assistant Examiner.*

U.S. Cl. X.R.

318—254